A. F. RALDEANO.
FORTUNE TELLING DEVICE.
APPLICATION FILED FEB. 12, 1915.

1,157,581.

Patented Oct. 19, 1915.

Witnesses

Inventor
A. F. Raldeano
By Victor J. Evans
Attorney

UNITED STATES PATENT OFFICE.

AUGUST F. RALDEANO, OF POUGHKEEPSIE, NEW YORK.

FORTUNE-TELLING DEVICE.

1,157,581. Specification of Letters Patent. Patented Oct. 19, 1915.

Application filed February 12, 1915. Serial No. 7,728.

*To all whom it may concern:*

Be it known that I, AUGUST F. RALDEANO, a citizen of the United States, residing at Poughkeepsie, in the county of Dutchess and State of New York, have invented new and useful Improvements in Fortune-Telling Devices, of which the following is a specification.

An object of the invention is to provide a simple device for use in telling fortunes by certain signs, such as the signs of the zodiac and the like.

The invention contemplates, among other features, the provision of a simple structure which can be readily operated, consists of few and simple parts and which, when used in conjunction with the signs of the zodiac, provides an effective fortune telling device.

Figure 1:
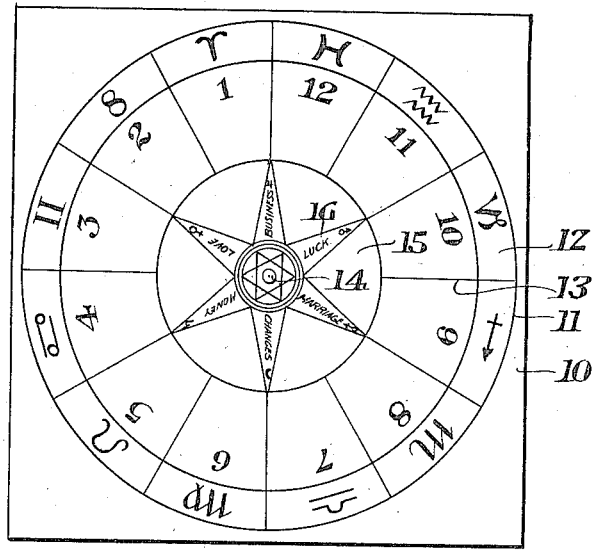
Figure 2:
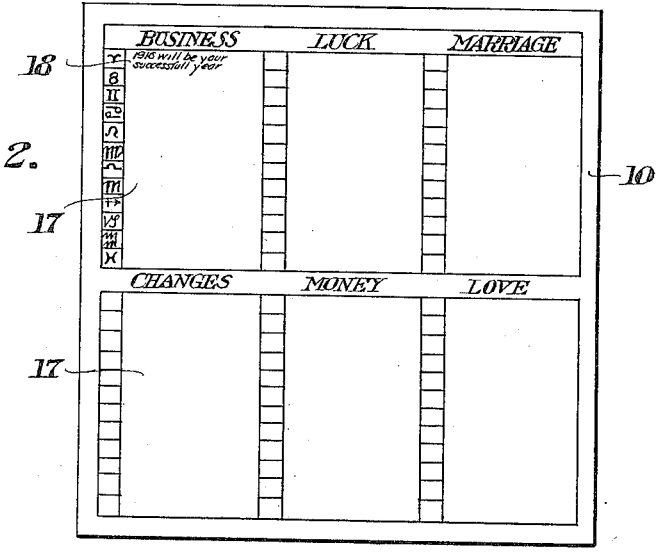
Figure 3:
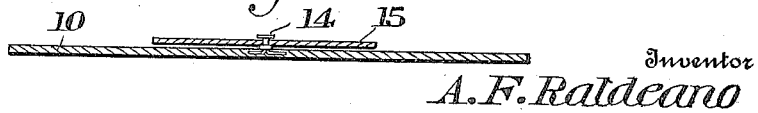

In the further disclosure of the invention reference is to be had to the accompanying drawings, constituting a part of this specification, in which similar characters of reference denote corresponding parts in all the views, and in which:

Figure 1 is a front elevation of the device; Fig. 2 is a rear elevation; and Fig. 3 is a vertical sectional view taken through the device.

The device hereinafter to be described is in the nature of a simple structure which will readily amuse and prove interesting to persons desiring to tell their own fortunes or those of their friends and to this end the device consists of a body or placard 10 preferably rectangular in shape and having on its front face a circle 11 divided into divisions 12, there preferably being one division for each sign of the zodiac as shown, so that there will be a total number of twelve divisions. The dividing of the circle into the divisions 12 is accomplished by radial lines 13 and mounted to revolve on the placard 10 by means of a suitable transversely extending pin 14 is a rotatable member 15 in the nature of a disk, said disk having preferably a six pointed star 16 depicted thereon, the rotatable member 15 lying within the circle 11 as shown and partially covering the radial lines 13 which form the divisions 12 of the circle 11. Each of the points of the star 16 has inscribed therein a word such as "Luck", "Marriage", "Business", "Love", "Money" or any other suitable terms which it may be desired to use in connection with the device. The signs of the zodiac are inscribed in the divisions 12 and on the back of the placard 10 there is printed or otherwise arranged a list of seventy-two answers or fortunes, classified in divisions 17, there preferably being six divisions to concord with the six pointed star 16 and the words printed thereon. Each division 17 has twelve of the answers or fortunes therein indicated by the numeral 18, said answers or fortunes corresponding to the twelve signs of the zodiac in the circle.

In the use of the device described the person desiring to tell a fortune or have his or her fortune told regarding "Business" imparts a rotating movement to the dial or disk-like member 15 and when the rotation of said member ceases the particular sign of the zodiac toward which the point of the star having the word "Business" therein projects, is carefully noted, said point of the star projecting toward one of the twelve divisions in the circle 11. The placard is now turned around and the party then observes on the back of the placard the particular division 17 of the sign of the zodiac toward which the point of the star projected after the dial had ceased rotating. Under this particular division the word "Business" is found, properly classified as mentioned heretofore and the proper answer or fortune will appear adjacent the word "Business" as clearly set forth in the drawing, this answer being the result which it is desired to obtain.

From the foregoing description it will be seen that the device described consists of few and simple parts, that it can be readily operated by any one who has carefully read the directions or is conversant with the device, and it will be further seen that the device described, due to its simplicity, readily permits of the same being manufactured at a very low cost.

Having thus described my invention, I claim:

As a new article of manufacture, a fortune telling device comprising a placard having a circle on its face, said circle being divided into divisions denoting the signs of the zodiac, with the back of the placard having a series of answers divided into divisions designated by the signs of the zodiac and corresponding with the signs of the zodiac on the face of the placard, and a rotatable disk-like member on the placard and revolving within said circle, said disk-like member having a star inscribed thereon and having words indicative of events in a person's life, in the pointed portions of the star, the answers in the divisions on the back of the placard being classified in accordance with the words in the pointed portions of the star whereby the indication of one of the pointed portions of the star to one of the signs of the zodiac in the circle will impart to the operator a key for producing the desired answer in the device on the back of said placard.

In testimony whereof I affix my signature in presence of two witnesses.

AUGUST F. RALDEANO.

Witnesses:
STEPHEN G. GUERNSEY,
WINIFRED T. KRIEGER.

Copies of this patent may be obtained for five cents each, by addressing the "Commissioner of Patents, Washington, D. C."